United States Patent [19]

Sgaslik

[11] Patent Number: 4,726,821
[45] Date of Patent: Feb. 23, 1988

[54] APPARATUS FOR THE TREATMENT OF SUBSTRATES IN A GAS STREAM

[75] Inventor: Friedrich Sgaslik, Regensburg, Fed. Rep. of Germany

[73] Assignee: Andre Buechl Kalk- und Portlandzementwerk, Regensburg, Fed. Rep. of Germany

[21] Appl. No.: 25,149

[22] PCT Filed: Jul. 24, 1986

[86] PCT No.: PCT/DE86/00304
§ 371 Date: Jan. 7, 1987
§ 102(e) Date: Jan. 7, 1987

[87] PCT Pub. No.: WO87/00767
PCT Pub. Date: Feb. 12, 1987

[30] Foreign Application Priority Data

Jul. 30, 1985 [DE] Fed. Rep. of Germany .... 3527187.6

[51] Int. Cl.⁴ ..................... B01D 33/20; B01D 23/24
[52] U.S. Cl. ........................................ 55/196; 55/296; 55/390; 55/474; 55/479
[58] Field of Search ................. 55/196, 208, 296, 390, 55/474, 479

[56] References Cited

U.S. PATENT DOCUMENTS

| 2,493,356 | 1/1950 | Mercier et al. | 55/474 X |
| 4,214,878 | 7/1980 | Weiss | 55/474 X |
| 4,225,327 | 9/1980 | Sgaslik et al. | 55/474 X |
| 4,351,650 | 9/1982 | Shinoda et al. | 55/208 X |
| 4,354,862 | 10/1982 | Sgaslik | 55/474 X |

Primary Examiner—Kathleen J. Prunner
Attorney, Agent, or Firm—Lucas & Just

[57] ABSTRACT

In an apparatus for the treatment of substances in a gas stream, in particular for the absorption and/or adsorption or filtering of gases, a plurality of annular treatment spaces, which are arranged concentric to a vertical axis in each case and are used for receiving a treatment medium and which divide the inner space of a casing of the apparatus into a first and a second chamber, are provided one above the other. Each treatment space has fresh treatment medium supplied to it at an upper opening in each case by way of at least one duct. An evacuation apparatus for removing the treatment medium is provided at the lower outlet opening of each treatment space. The treatment spaces form a unit which is driven in a rotating manner about the vertical axis, and the duct and preferably also the evacuation apparatus are arranged fixed for supplying fresh treatment medium so that in particular as the treatment medium is supplied a uniform distribution of the medium over the entire interior of each treatment space can be achieved.

6 Claims, 2 Drawing Figures

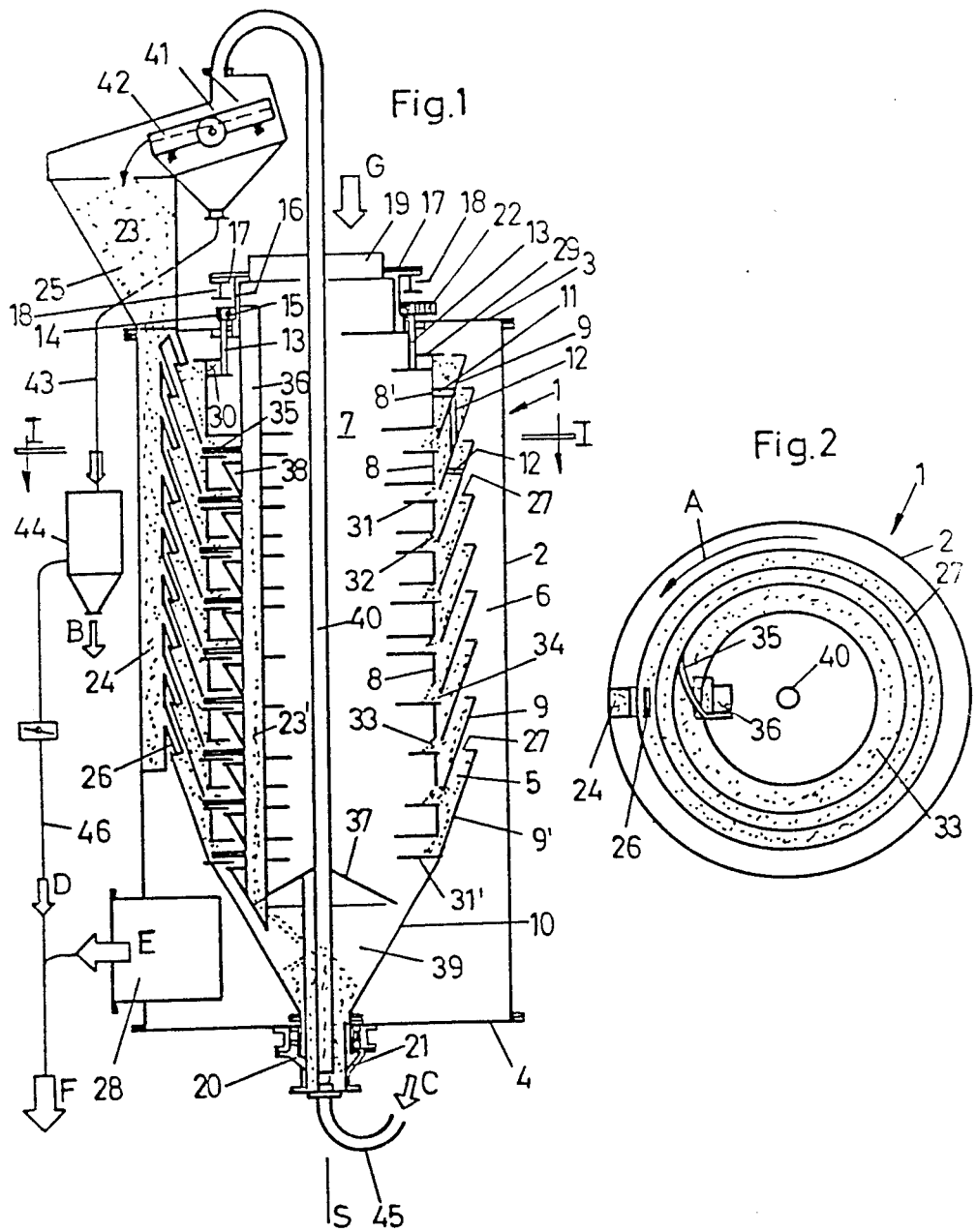

APPARATUS FOR THE TREATMENT OF SUBSTRATES IN A GAS STREAM

The invention relates to an apparatus for the treatment of substances in a gas stream in accordance with the preamble of patent claim 1.

An apparatus of this type is known per se (German Pat. No. 30 02 773).

As this known apparatus is used as a filtering plant, it is frequently also referred to as a counter-flow packed-bed filter. A filter of this type is used for example to remove the dust from the gas during the production of lime or cement. In the case of the known apparatus a suitable treatment or filtering medium can be ordinary filtering gravel or even fractions of this material, which forms the bulk material present in the operating process and to which for example the particles (dust particles), which are present in the gas or the air to be cleaned and which are to be filtered out, are to return.

In the case of the known filter the annular treatment spaces, arranged in a fixed manner one above the other in the interior of a casing and concentric to a vertical axis or axis of symmetry, are formed in such a way that—with the exception of the lowest treatment space—each treatment space extends with its lower part bounded by its walls into the upper part of the underlying treatment space and is connected at that point to the underlying treatment space by a passage opening. The fresh treatment or filtering medium, i.e. the treatment or filtering medium which has not yet undergone the operating process in the apparatus, is conveyed to the upper inlet opening of each treatment space by way of a plurality of fixed ducts which comprise corresponding openings and which extend in the vertical direction in each case and are arranged distributed at uniform intervals about the treatment spaces. In order to remove the treatment medium from the treatment spaces in the region of the lower outlet openings of these spaces, evacuation apparatus are provided in the case of the known apparatus, at least one evacuation apparatus being provided for each treatment space. All the evacuation apparatus, which are formed by wipers for example and pass through the charging cones of the treatment medium occurring at the lower outlet openings are secured to a shaft which is situated coaxially with the axis of symmetry of the treatment spaces and is driven in a rotating manner about the said axis.

The known apparatus is not only suitable as a filter but can also be used generally for the treatment of substances in a gas stream, and also for example for absorption and/or adsorption, in order to remove or filter out gas constituents for example, such as fluorine etc. from a gas stream, and can also be used as a reactor, in order to produce a chemical reaction between the treatment medium and the gas stream or substances present in the gas stream, or even to dry the treatment medium by the gas stream. On account of the nested arrangement of the individual treatment spaces and on account of the passage openings provided in the lower part of the said treatment spaces (with the exception of the lowest treatment space) this known apparatus has considerable advantages. In the first place for example this design prevents the treatment medium from being deposited, forming lumps or forming a coating which would obstruct the evacuation apparatus or their operation in corners or blind spaces in the lower region of the treatment spaces, i.e. in the active region of the evacuation apparatus. A further major advantage of the known apparatus is that, on account of the nested arrangement of the treatment spaces and on account of the fact that with the exception of the lower treatment space each treatment space is connected by its lower part to the underlying treatment space by the passage opening, a particularly advantageous "sluicing effect" which substantially improves the treatment result is achieved, namely in the form that the gas entering a treatment space at the lower outlet opening for the treatment medium does not leave the treatment medium at the upper region of the said treatment space but rather (on account of the shorter flow path) at the upper region of the underlying treatment space. Even if the removal is carried out with the aid of the evacuation apparatus and the treatment medium and this medium in the treatment spaces is then displaced downwards from above, the gas on its path through the treatment medium always encounters an adequate quantity of medium, which (quantity) is at rest and in which the treatment action sought (for example absorption, adsorption or filtering action) is achieved in an optimum manner. This is essentially due to the fact that when treatment medium is removed by the evacuation apparatus from the treatment spaces in the lower region the subsequent displacement of the treatment medium in the upper region of the said treatment spaces always occurs with a time lag.

Finally, an additional, substantial advantage of the known apparatus is that on account of the nested arrangement, of the treatment spaces absolutely gas-tight connections between the individual walls forming the treatment spaces can be dispensed with, since possible connection points between these walls are always surrounded by treatment medium, which then prevents a direct flow of gas between the first and second chambers even if the connection points (welding seams) have not been made gas-tight or air-tight.

Although the known apparatus is thus highly advantageous from both the structural and the operational points of view, it is nevertheless subject to a certain disadvantage. On account of the fact that the fresh treatment medium is supplied by way of a plurality of vertical ducts which are arranged distributed around the treatment spaces and which are connected by way of openings in each case to the upper inlet opening of each treatment space, not only are charging cones formed from treatment medium in the region of these openings of the ducts for supplying the treatment medium on the top of each treatment space, i.e. the entire height of the treatment medium is not entirely uniform in each treatment space and is also greater in the region of the ducts for supplying the fresh treatment medium than in the region between two such ducts, but there is also a tendency, when using a treatment medium which is composed of particles of different grain size, for the finer particles of the treatment medium to be substantially concentrated in those areas of the treatment spaces which are immediately adjacent the ducts for supplying the fresh treatment medium. Coarser treatment medium is then preferably present in areas of the treatment spaces between two ducts of this type. Since a treatment medium of finer grain size results in an improved treatment effect, while causing a greater flow resistance to the gas, in the case of the known apparatus the gas stream will mainly be concentrated in those regions of the treatment spaces in which the treatment medium of coarser grain size is present, i.e. in areas between two adjacent ducts for supplying the treatment medium. In these areas, in which the treatment medium of coarser grain size is mainly present, the optimum treatment effect does not then occur.

The object of the invention is further to develop an apparatus of the type described above according to the invention in such a way that a uniform distribution of the treatment medium with respect to height and also grain size occurs in the individual treatment spaces, while retaining the basic advantages of the known apparatus.

In order to attain this object, according to the invention an apparatus is constructed in accordance with the characterizing part of patent claim 1.

In addition to the advantages of the known apparatus, the apparatus according to the invention also has the advantage that, on account of the rotary arrangement of the treatment spaces or on account of their design as a rotor-like unit—which is mounted so as to be rotatable about the axis of symmetry and is driven in a rotating manner—in conjunction with the fixed arrangement of the at least one duct for supplying the fresh treatment medium, the treatment medium is delivered to each treatment space simultaneously on a caterpillar-type or annular line. This ensures that the height of the treatment medium is the same in each treatment space in all areas and that as the treatment medium is delivered to the treatment spaces no separation of the treatment medium according to larger and finer particles occurs in such a way that particles of larger grain size are mainly concentrated in specific areas of the treatment spaces.

It is thus possible with the apparatus according to the invention to achieve a quite considerable improvement to the treatment action (e.g. absorption, adsorption or filtering action).

In a preferred embodiment of the apparatus according to the invention, as used in particular as a filter, the top of the first chamber comprises an inlet for the gas. The gas to be cleaned thus flows through this first chamber downwards from above and has the advantage that the particles of dust contained in the gas to be cleaned are distributed uniformly in the treatment spaces arranged one above the other.

In the case of a further, advantageous embodiment of the invention, likewise acting as a filter, it is provided that the treatment medium removed from the treatment spaces with the aid of the evacuation apparatus is supplied by way of a conveying device to a device for cleaning or regenerating the treatment medium, and the treatment medium cleaned or regenerated in this way is in turn used once more. In this connection the treatment medium removed from the treatment spaces with the aid of the evacuation apparatus is heated prior to the cleaning or regeneration, so that even in the case of an apparatus operating in the range of the dew point or below the dew point a trouble-free treatment result is ensured. The heating of the treatment medium removed from the treatment spaces can be carried out in various ways, for example by heated air, and has the advantage that only the surface of the treatment medium need be heated and not the entire mass of the particles forming the said medium. In this way the heating of the treatment medium and thus the separation of the particles of dust—adhering to the treatment medium by dampness—from the medium is made possible with little outlay in terms of energy, i.e. with an energy outlay which in any case is far less than the energy outlay which would be necessary for heating the entire gas to be heated or for heating the fresh treatment medium supplied to the treatment spaces or the treatment medium in the treatment spaces.

Further developments of the invention from the subject of the dependent claims.

The invention is explained in greater detail below by way of the Figures with reference to an embodiment, namely in connection with the use of the apparatus as a filter for filtering out dust. In addition, this embodiment of the apparatus according to the invention can be used for other purposes, i.e. in quite a general manner for the treatment of substances in a gas stream.

In the Figures

FIG. 1 is a longitudinal section through a filter according to the invention.

FIG. 2 is a cross-section through the filter according to FIG. 1 corresponding to the section line I—I in FIG. 1.

The filter illustrated comprises a casing 1 with a cylindrical outer or peripheral wall 2, the casing 1 being held by support elements or feet (not shown in greater detail) in such a way that the cylinder axis or the axis of symmetry S of the casing 1 extends in the vertical direction. The casing 1 is closed at its top by a cover plate 3 and on its underside by a base plate 4. The cover plate 3 and the base plate 4 are each made annular and are connected at their outer edge to the peripheral wall 2 in a sealed manner.

A plurality of treatment spaces (annular stages) 5 which taper downwards in an annular manner in each case and act as filter spaces are disposed one above the other concentrically to the axis of symmetry S in the interior of the casing 1, in such a way that these treatment spaces in their entirety divide the interior of the casing 1 into two chambers, namely into an outer annular chamber 6 which is bounded towards the outside by the peripheral wall 2 and towards the inside by the annular treatment spaces 5 disposed one above the other, and into an inner, essentially cylindrical chamber 7 which is closed off towards the outside by the treatment spaces 5 disposed one above the other. Each treatment space 5 is bounded towards the inner chamber 7 by an inner annular wall 8 and 8' respectively and towards the outside, i.e. towards the outer chamber 6, by a wall 9 and 9' respectively. The walls 9 and 9' respectively are formed by rings which are increased upwards in a conical manner, i.e. the diameter of the rings formed by the walls 9 and 9' respectively is greater at the top of each treatment space 5 than at the underside of the said treatment space, so that the treatment spaces are reduced towards their lower end in the manner described. As further shown in FIG. 1, the inner wall 8' of the uppermost treatment space 5 is higher than the corresponding walls 8 of the underlying treatment spaces, while the lower wall 9' of the lowest treatment space 5 is higher than the corresponding walls 9 of the overlying treatment spaces and at its lower end passes into a wall portion 10 which narrows in a conical or funnel-shaped manner and which separates the two chambers 6 and 7 from one another in the region below the treatment spaces 5. The walls 8, 8', 9 and 9' and the wall portion 10 are each orientated concentrically to the axis of symmetry S. By means of a plurality of struts 11 and 12, which are provided inside the treatment spaces and which partially extend for example radially towards the axis of symmetry S and connect the walls 8 or 8' respectively and 9 of the treatment spaces 5 to one another (struts 11) and which partially extend at right angles to two successive walls 9 and 9' and connect them to one another (struts 12), the treatment spaces 5 or the walls 8, 8', 9 and 9' bounding the said treatment spaces from, together with the wall portion 10, a rigid rotor-like unit which bounds the inner chamber 7 and which is mounted in the interior of the casing 1 so as to be rotatable about the axis of symmetry S. For this purpose the upper end of the said rotor-like unit is connected in a sealed manner to the lower end of a ring 13 which lies concentrically to the axis of symmetry S and which is held at its upper end on the outer ring 14—provided with a tooth section—of a ball-bearing slewing rim. The inner ring 15 of this ball-bearing slewing rim is secured to the lower end of a ring 16 which likewise lies concentrically to the axis of symmetry and which is in turn held by its upper edge on a cover plate 17 supported on carriers 18 which in turn rest at both ends in each case on supports (not shown in greater detail) on the top of the casing 1. A rigid bearing for the upper end of the rotor-like unit comprising the treatment spaces 5 is thus formed by way of the ring 15 of the ball-bearing slewing rim, the ring 16, the cover plate 17 and the carriers 18. The inlet 19 for the gas to be cleaned is provided in the cover plate 17, which together with the ring 16 and partially also with the ring 13 bounds the inner chamber 7 towards the top.

The lower end of the rotor-like unit formed by the treatment spaces is mounted rotatably on the base plate 4, in such a way that the lower end of the wall portion 10 has joined to it a tubular or hollow cylindrical member 20 which is closed at the bottom and which is guided through the central opening provided in the annular base plate 4 and is mounted on the base plate 4 outside the casing 1 by means of a self-aligning slide bearing 21.

The toothing of the outer ring 14 of the ballbearing slew rim is engaged by a pinion 22 which is connected to a drive (not shown in greater detail) and with which the rotor-like unit formed by the treatment spaces 5 is driven in a rotating manner about the axis of symmetry S anti-clockwise, in the illustration selected for FIG. 2 i.e. in the direction of the arrow A.

In order to supply fresh or cleaned filter medium 23, a closed, fixed duct 24, which extends in the vertical direction, i.e. parallel to the axis of symmetry S, and which is likewise closed at its lower end and the upper end of which opens into a storage container 25—disposed outside the casing 1 above the cover plate 3—for the cleaned filter medium 23, is formed in the interior of the chamber 6 and directly adjacent the inner face of the peripheral wall 2. It is to be understood that the duct 24 is guided through the cover plate 3 with its upper end or the transition area sealed off from the storage container 25. At its side facing the axis of symmetry S the fixed duct 24 comprises, in the direction of the said axis of symmetry and one above the other, a plurality of rotor-like outlet sockets 26, which open into the duct 24, extend obliquely downwards and are open at their free lower end and which have a rectangular cross-section and each of which projects into an upper opening 27 of a treatment space 5, by way of which the said treatment space communicates with the outer chamber 6 for collecting and removing the cleaned gas (by way of an outlet 28). In all the treatment spaces 5, with the exception of the upper treatment space 5, the opening 27 is formed between the upper edge of the wall 9 or 9' respectively of the respective treatment space 5 and the outer face of the central area of the wall 9 of the overlying treatment space. In the case of the upper treatment space 5 the opening 27 is formed between the upper edge of the wall 9 of the said treatment space and the outer edge of a ring 29 which is disposed concentrically to the axis of symmetry S and lies with its surface sides at right angles to the said axis of symmetry and which connects the upper edge of the annular wall 8' to the lower region of the ring 13, preferably by way of a Cardan-like suspension which as a whole is designated 30 in FIG. 1 and is additionally bridged in the interior of the chamber 7 by a gasket (not shown in greater detail). As the rotor-like unit formed by the treatment spaces 5 is rotated about the axis of symmetry S (arrow A), the filter medium 23 is discharged uniformly, i.e. on an annular line, to the individual treatment spaces 5 in the region of the openings 27 by way of the outlet sockets 26. The particular advantage in this case is that during the discharge of the filter medium no separation of the said filter medium takes place in such a way that specific areas of the treatment spaces 5 contain exclusively coarse filter medium and specific areas of the treatment spaces 5 contain both coarse and finer filter medium. The distribution of the filter medium 23 is in fact uniform over the entire area of each treatment space 5 in terms of the grain size of the said filter medium.

The treatment spaces 5, which are stacked inside one another in such a way that—with the exception of the lowest treatment space 5—each treatment space projects with its lower part, i.e. with its lower half in the case of the embodiment illustrated, into the underlying treatment space, each comprise a base surface formed by a horizontal ring 31 or 31' respectively lying concentrically to the axis of symmetry S, in which case—with the exception of the lowest treatment space 5—the ring 31 is secured in each case to the upper edge of the wall 8 of the underlying treatment space 5. In the case of the lowest treatment space 5 the ring 31' is secured to the outer wall 9', namely in the region of the transition point between this wall and the wall portion 10. The rings 31 and 31' also extend slightly into the interior of the chamber 7, i.e. the inner edge of these rings lies closer to the axis of symmetry S in each case than the walls 8 and 8' respectively.

An annular opening 32 extending concentrically to the axis of symmetry S is formed on the top of each ring 31 and 31' respectively for each treatment space 5, in such a way that the lower edge of the annular wall 8 and 8' respectively of the treatment space in question terminates above the associated ring. The treatment spaces 5 are connected to the inner chamber by way of the openings 32 in each case. The region of the rings 31 and 31' which projects beyond the said openings 32 into the inner chamber 7 forms, with its top, a support surface in each case, on which can be formed a charging cone 33 of filter medium which slides outwards through the respective opening 32.

With the exception of the lowest treatment space 5, in the region of the base surface formed by the associated ring 31 each treatment space comprises a further opening 34 which lies further outwards and is likewise made annular and extends concentrically to the axis of symmetry S and by which each treatment space 5 (with the exception of the lowest treatment space) is connected to approximately the central area of the underlying treatment space in each case. The openings 34 are formed in such a way that the lower edge of the wall 9 of each filter space is situated at a distance above the associated ring 31 or the outer edge of the said ring respectively.

The individual treatment spaces 5 are thus stacked one inside the other in such a way that each treatment space 5—with the exception of the lowest treatment space—extends with its lower partial area bounded by the walls 8 and 8' and the lower portion of the wall 9 into the upper partial area of the underlying treatment space, i.e. each treatment space 5—with the exception of the lowest treatment space—is surrounded in its lower partial area by the upper partial area of the underlying treatment space, which is made possible by the design of the walls 9 as rings which interlock, i.e. which narrow in a tapered manner towards the lower end in each case, and which are arranged in a conical manner to the axis of symmetry S. In addition, each treatment space 5—with the exception of the lowest treatment space—is connected to the underlying treatment space by an opening 34.

In order to remove the used filter medium 23', each treatment space 5 has associated with it a removal apparatus which in the embodiment illustrated is formed by a wiper 35. The wipers 35, which are disposed slightly above the rings 31 and 31' respectively and project into the charging cones 33 and into the interior of the respective treatment space 5 and extend with their end lying radially outwards as far as the vicinity of the opening 34 or (in the case of the lowest treatment space 5) as far as the region of the transition point between the wall 9' and the ring 31', are secured to a common collecting duct 36 extending in the vertical direction for removing the used filter medium 23. The collecting duct 36, which is closed at its upper end, is arranged fixed inside the chamber 7, in such a way that the upper end of the said collecting duct is secured to the inside of the ring 16 and the lower end of the said collecting duct is secured to a wall 37 which is held rotationally rigidly and is arranged concentrically to the axis of symmetry S. Under each wiper 35 or under each ring 31 or 31' respectively is provided a collecting trap 38 which opens into the collecting duct 36 and is open at its top and which collects the used filter medium removed from the charging cones 33 by the corresponding wiper 35 (during the rotation of the rotor-like unit formed by the treatment spaces 5 relative to the wipers 35) and conveys it into the collecting duct 36. The collecting duct 36 extends with its lower open end through the tapered wall 37 and opens into a chamber 39—formed below the said wall and also separated by the wall portion 10 from the chamber 6—for collecting and removing the used filter medium 23. The open end of a conveying tube 40, which is situated with its axis coaxial with the axis of symmetry S and is guided—sealed off from the outside—in the central region of the inlet opening 19 for the crude gas or in the region of a connection (not shown in greater detail) which is provided there and by way of which the crude gas is supplied, extends into the lower end of the chamber 39, which is formed by the interior of the hollow cylindrical member 20 closed at the bottom. The conveying tube 40 opens at its upper end into a treatment space 41 which is closed off from the outside and narrows downwards in the manner of a funnel, namely above an obliquely orientated riddle sifter 42, the ejection end of which is connected to the chamber 25. The filter medium brought up to the riddle sifter 42 by way of the conveying tube 40 is cleaned on the said riddle sifter, i.e. the particles of dust adhering to the filter medium are separated from the filter medium and are removed by way of a pipeline 43 and a filter 44, as indicated by the arrow B. The filter medium in the conveying tube 40 is conveyed upwards by compressed air which is supplied as shown by the arrow C by way of the a tube 45 which is disposed with its open end in the lower area of the chamber 39 directly opposite the lower open end of the conveying tube 40. The used filter medium 23' present in the chamber 39 is thus taken up by the compressed air issuing from the tube 45 and in this way is conveyed upwards in the filter tube 40 to the riddle sifter 42. After passing through the filter 44, i.e. in the cleaned state by way of a line 46 in accordance with the arrow D, the conveying air is conveyed outwards or is introduced into the cleaning gas duct (not shown in greater detail) joined to the outlet 28 and is removed (arrow F) together with the cleaned gas issuing from the outlet 28 (arrow E).

The mode of operation of the filter can be described as follows: the gas to be cleaned is supplied to the filter by way of the inlet 19 as shown by the arrow G, namely in the upper area of the chamber 7. This manner of supply has the particular advantage that the particles of dust contained in the gas to be cleaned can be uniformly distributed over the entire height of the chamber 7 and so the treatment spaces 5 arranged one above the other can be acted upon by particles of dust with equal force in each case, this not being the case when the gas or crude gas to be cleaned is supplied to the lower area of the inner chamber 7. In this case the particles of gas would concentrate essentially in the lower area of the chamber 7, so that the lower treatment spaces 5 would be acted upon by particles of dust with greater force than the upper treatment spaces.

The gas to be cleaned then passes out of the chamber 7 through the openings 32 into the individual treatment spaces 5 and flows up from below through the filter medium 23 present in the said treatment spaces. The gas cleaned in this way leaves the individual treatment spaces at the upper openings 27, and the gas flow through the treatment spaces is determined both by the internal nesting of the individual treatment spaces and by the additional openings 34 in such a way that the gas entering at the opening 32 of a treatment space leaves the filter medium again mainly at the opening 27 of the underlying treatment space 5. This applies to all the treatment spaces with the exception of the lowest treatment space. This flow produces the sluice effect which is particularly advantageous for the filtering result, i.e. on account of the retarded settling of the filter medium in the individual treatment spaces 5 the gas on its path through the filter medium always encounters part of the filter medium which is at rest and thus has the optimum filtering action. The cleaned gas emerging from the filter medium at the openings 27 is collected in the outer chamber 6 and is removed by way of the outlet 28.

By virtue of the fact that on account of the treatment spaces 5 rotating about the axis of symmetry S a uniform supply of the fresh filter medium 23 to the individual treatment spaces 5 is ensured in the manner described above, and that it is ensured in particular that in all areas of each treatment space 5 the composition of the grain pattern of the filter medium is uniform, i.e. there are no areas in which substantially only filter medium of large grain size is present, a completely uniformly distributed gas flow through the treatment spaces 5 and an optimum cleaning of the crude gas is made possible.

Grit or another flowable material is suitable as the filter medium in the case of this filter too.

If the filter is employed in the vicinity of the dew point or below the dew point, hot air is supplied by way of the tube 45, and then heats the particles of the filter medium only on their surface to the extent that the dust adhering to the filter medium can be dried and thus removed with the aid of the riddle sifter 42.

The invention has been described above with reference to one embodiment. It is to be understood that modifications and alterations are possible without thereby departing from the concept underlying the invention. It is thus of course possible to return the used filter medium 23', i.e. enriched with particles of dust, from the chamber 39 and to clean this filter medium in a manner different from that described above. Mechanical conveying devices (conveyor belts, conveyor worms etc.) can also be used for returning the filter medium from the chamber 39. Drum-like sieves etc. driven in a rotating manner are also suitable for cleaning the used filter medium 23.

I claim:

1. An apparatus for the treatment of substances in a gas stream, in particular for the absorption and/or the adsorption or the filtering of gases, having a first preferably inner chamber for supplying a gas, a second, preferably outer chamber for removing the gas and a plurality of annular treatment spaces which are arranged one above the other in an axial direction and interposed between the first and the second chamber and which are separated from one another and from the first and the second chamber by walls in each case and which each comprise at least one upper inlet opening for a treatment medium consisting of solid particles in the upper part and at least one lower outlet opening for the treatment medium in the lower part, each treatment space having fresh, purified and/or regenerated treatment medium supplied to it at the upper inlet opening by way of at least one duct, and an evacuation apparatus for removing the treatment medium being provided at the lower outlet opening of each treatment space which opens into the first chamber, the outlet openings forming inlets for the gas into the treament spaces which in each case are connected at their upper part to the second chamber, each treatment space—with the exception of the lowest treatment space—extending with the lower part bounded by its walls into the upper part of the underlying treatment space and being connected there to the underlying treatment space by a passage opening, characterized in that the treatment spaces (5) or the walls (8, 8'; 9, 9') bounding these treatment spaces (5) respectively form part of a rotor-like unit which is mounted so as to be rotatable about the axial direction (S) and is driven in a rotating manner, and the duct is arranged in a fixed manner for the supply of fresh treatment medium (23) and comprises portions (26) which extend into the upper inlet openings (27) and have openings for supplying the treatment medium (23).

2. An apparatus according to claim 1, characterized in that the evacuation apparatus (35) are arranged in a fixed manner.

3. An apparatus according to claim 2, characterized in that the duct for supplying the fresh treatment medium (23) is disposed radially outside the rotor-like unit and the evacuation apparatus (35) are disposed radially inside the rotor-like unit.

4. An apparatus according to claim 1, characterized in that the evacuation apparatus (35) are provided on at least one collecting duct (36) arranged in a fixed manner for removing the treatment medium (23'), conveying means (40) are provided in order to convey the treatment medium (23') removed from the treatment spaces (5) to a device (41, 42) for cleaning and/or for regeneration which is connected to a chamber (25) for receiving the fresh or cleaned or regenerated treatment medium (23) which (chamber) is in turn connected to the at least one duct (24) for supplying the treatment medium (23) to the treatment spaces (5), and means are provided for heating the treatment medium prior to the cleaning or regeneration.

5. An apparatus according to claim 4, characterized in that the means for heating the treatment medium (23') are formed by at least one outlet nozzle or outlet opening for heated air or heated gas.

6. An apparatus according to claim 1 characterized by an inlet (19) for the gas to the first chamber (8) which is disposed on the top of the said chamber.

* * * * *

UNITED STATES PATENT AND TRADEMARK OFFICE
CERTIFICATE OF CORRECTION

PATENT NO. : 4,726,821
DATED : February 23, 1988
INVENTOR(S) : Friedrich Sgaslik It is certified that error appears in the above-identified patent and that said Letters Patent is hereby corrected as shown below: On The Title Page:

In the title: change "Substrates" to -- Substances --.

Column 5, line 3, change "from" to -- form --.

Column 7, line 30, change "23" to --23'--.

Signed and Sealed this

Eighth Day of November, 1988

Attest:

DONALD J. QUIGG

*Attesting Officer*   Commissioner of Patents and Trademarks